United States Patent
Carter et al.

(10) Patent No.: US 6,819,884 B1
(45) Date of Patent: Nov. 16, 2004

(54) DETERMINING TONER USAGE

(75) Inventors: Philip Scot Carter, Lexington, KY (US); William Keith Richardson, Salvisa, KY (US); Jason Carl True, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/631,313

(22) Filed: Jul. 31, 2003

(51) Int. Cl.[7] .............................................. G03G 15/08
(52) U.S. Cl. ......................................... 399/27; 399/24
(58) Field of Search ..................................... 399/27, 24

(56) References Cited

U.S. PATENT DOCUMENTS

| | | | |
|---|---|---|---|
| 3,529,546 A | | 9/1970 | Kollar |
| 4,413,264 A | | 11/1983 | Cruz-Uribe et al. |
| 4,725,892 A | * | 2/1988 | Suzuki et al. ............... 382/299 |
| 5,204,698 A | | 4/1993 | LeSueur et al. |
| 5,204,699 A | | 4/1993 | Birnbaum et al. |
| 5,349,377 A | | 9/1994 | Gilliland et al. |
| 5,655,174 A | | 8/1997 | Hirst |
| 5,797,061 A | | 8/1998 | Overall et al. |
| 5,918,085 A | | 6/1999 | Rollins et al. |
| 5,937,225 A | * | 8/1999 | Samuels ....................... 399/27 |

* cited by examiner

Primary Examiner—Quana Grainger
(74) Attorney, Agent, or Firm—John A. Brady

(57) ABSTRACT

Toner transfer in an imaging device having a developer roller (5) that applies toner to a photoconductive roller 7 is determined by counting pels (38) and by counting operating cycles (56). Additionally in the embodiment, various device factors including darkness setting and type of toner are also applied to the totals. An adjustment factor, stored in a toner cartridge memory, is originally substantially one and may be adjusted based on subsequent knowledge or observations of the results. A page count of pages imaged is also used dependently as a second basis for amount of toner transferred.

21 Claims, 4 Drawing Sheets

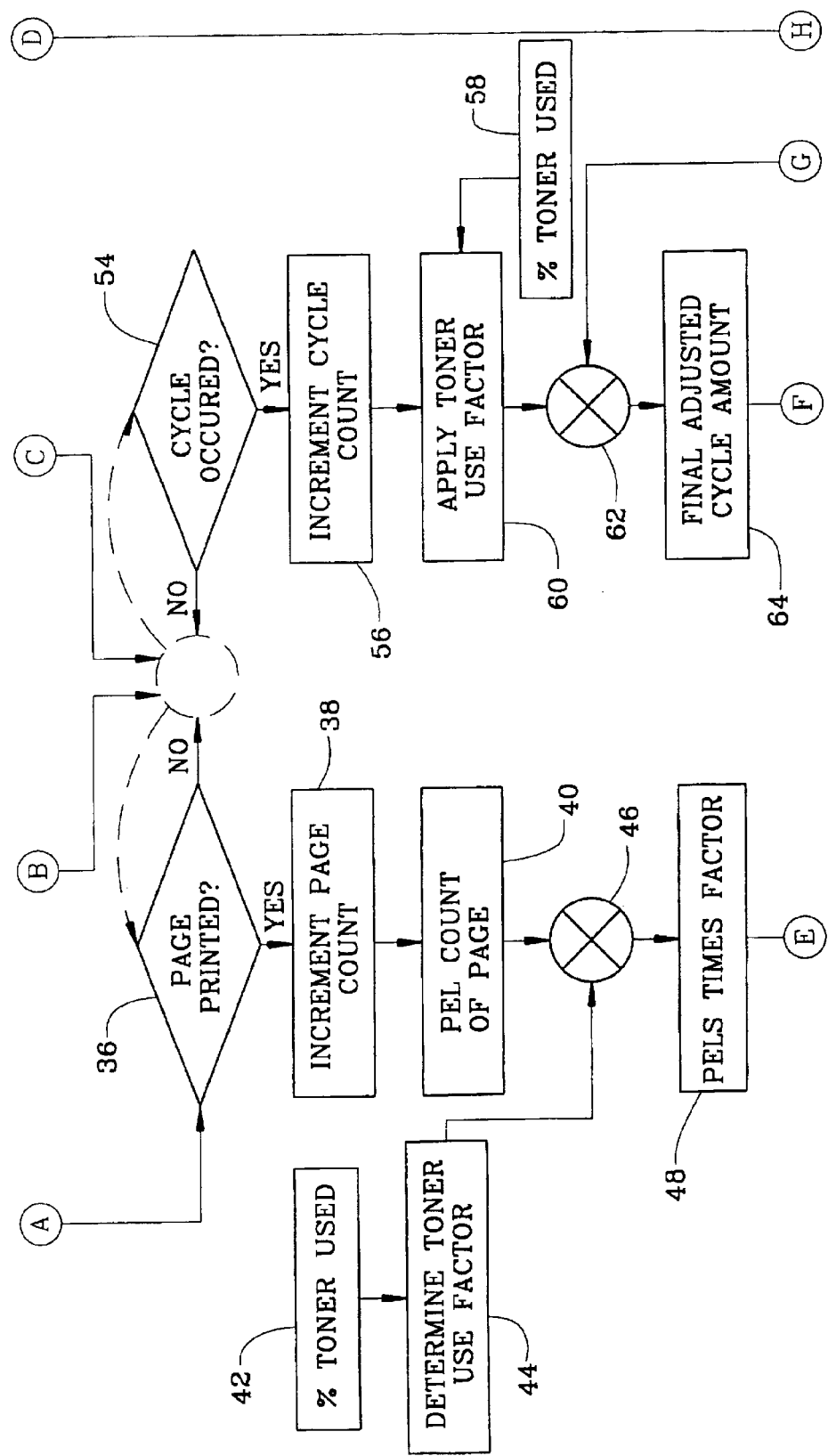

DETERMINING TONER USAGE

TECHNICAL FIELD

This invention relates to determining toner usage in an imaging device having a photoconductive roller that receives toner from a developer roller.

BACKGROUND OF THE INVENTION

Automatic determination of toner usage is useful both to signal an operator when the hopper or other source of toner is empty or approaching empty, and, similarly, to signal the operator when a chamber of toner cleaned from the photoconductor is full or approaching full.

Measurement of toner used by counting pels is well known. (Pels are dots or other small picture elements.) This invention employs counting pels as a major element of it determination of usage. However, employing only pel counting does not account for start and end of imaging device operation nor for blank or near blank pages made by the imaging device.

Typically, at start up several cycles of rotation of the photoconductor occur and, although ideally no toner would be used, this invention recognizes that, in total, a nontrivial amount of toner is used with such blank operations. Also, when an image has very light pet usage, this invention recognizes that, in total, a significant amount of toner is used in printing such near blank or blank pages.

Additionally, a number of operating factors of the imaging device may be used to scale the results from pet applications and blank operations.

DISCLOSURE OF THE INVENTION

This invention is directed to imaging devices, which are controlled by electronic data processing and to imaging based on pels (small picture elements). Such digital imaging devices are now widely available as printers and copiers and the like.

In this invention the number of pels imaged is determined and that number is multiplied by at least one pel weight factor. Similarly the amount of photoconductor rotation during non-imaging operation is determined and that amount is multiplied by at least one rotation weight factor.

In specific implementations the weight factors may vary over usage as the amount of toner usage varies with different darkness settings of the imaging device, different process speeds, different resolutions for printing, different papers or other media being imaged, and different ambient conditions, and with exceptionally high coverage imaging and with the amount of previous toner used from an unreplenished source. Accordingly the weight factors reflecting these are better applied with each page printed or revolution of the photoconductive roller.

Additionally, a factor of essentially 1, which may be termed an adjustment factor, is initially applied, and that factor may be changed for future operations, based on actual experience. The adjustment factor can be stored in memory on a replaceable toner cartridge, from which it is obtained by the printer on which the cartridge is installed.

The exact weight factors and how many different factors are employed depend on the specific characteristics of the imaging device and are obtained by actual tests on representative imaging devices. Accordingly, exact values for a specific device are incidental to this invention.

The factors may vary moderately when the ultimate result is for determination of the amount of toner in the cleaner chamber rather than for the amount of toner used from the toner supply.

BRIEF DESCRIPTION OF THE DRAWINGS

The details of this invention will be described in connection with the accompanying drawings, in which.

DESCRIPTION OF THE PREFERRED EMBODIMENTS

Figure 1:
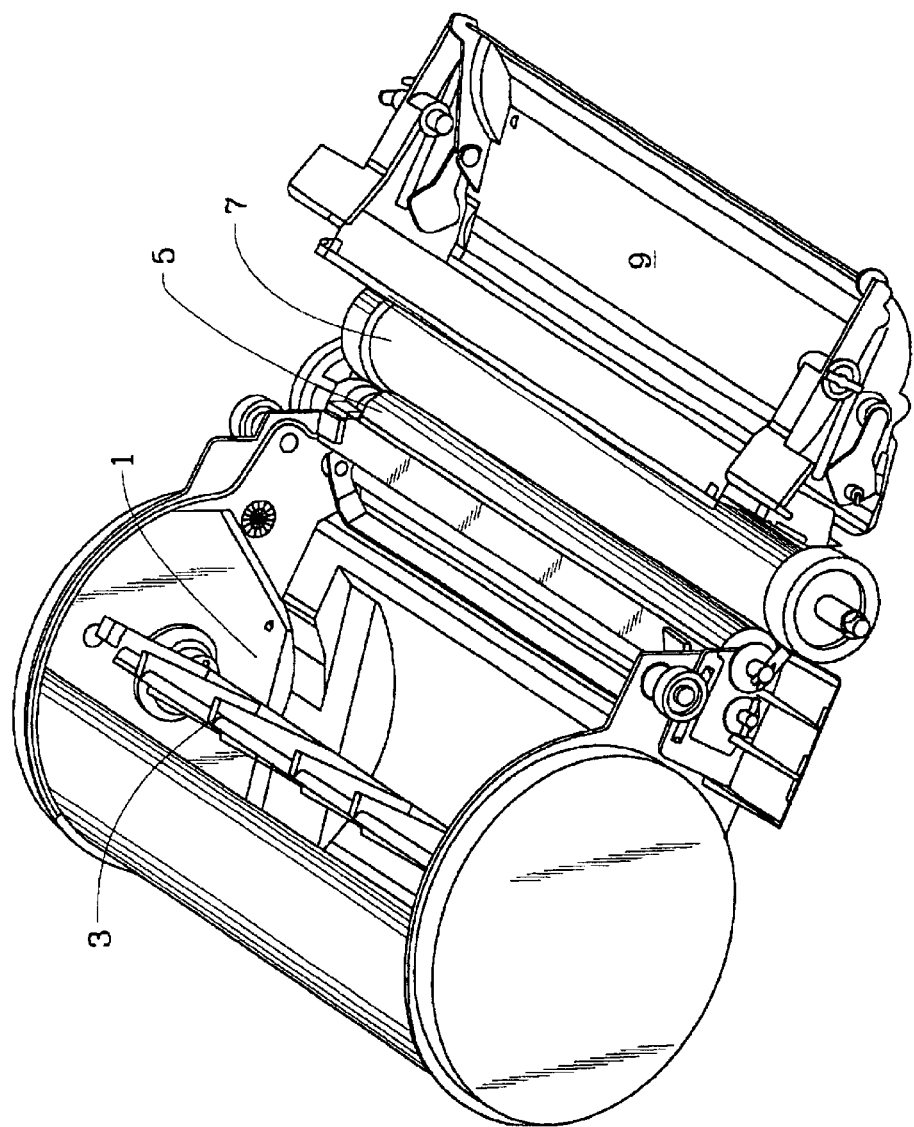
FIG. 1 is illustrative of the primary imaging apparatus to which this invention relates, and FIGS. 2A, 2B, and 2C (collectively FIG. 2) are illustrative of a specific implementation of this invention.

FIG. 1 is a perspective view with top elements removed for clarity of apparatus used in laser imaging. The toner supply is hopper 1 (toner not shown for clarity). During imaging operations paddle 3 moves toner from hopper 1 to developer roller 5. Developer roller 5 rotates with photoconductor roller 7 (often termed a photoconductor drum). After imaging, toner remaining on the photoconductor roller 7 is scraped into cleaner chamber 9 by a cleaning blade (not shown) or other cleaning mechanism. The elements shown in FIG. 1 constitute a conventional, replaceable toner cartridge, which, when no longer usable, is extracted from the imaging device and replaced by a fresh and usable cartridge.

As the foregoing and related elements and operation is entirely conventional, other parts supporting the imaging operation will not be discussed in detail. Among these elements are a laser and optical system to form a latent electrostatic image on photoconductor 7 and at least one electronic data processing apparatus and associated electronic memory to control imaging of the imaging device.

When the imaging device is activated several parts must be brought to operating speed and temperature. Included in these parts are the developer roller 5 and the photoconductor roller 7, as well as typically a mirror rotated by a motor in the optical system and toner paddle 3. Accordingly, at activation several rotations of rollers 5 and 7 typically occur without imaging. At the end of activation, typically at least one rotation of roller 5 and 7 occurs so as to clean residual toner from photoconductor roller 7.

Since the entire imaging operation is controlled by an electronic data processor, the unique details of imaging are defined by the code being executed and determination of pels printed and revolutions without imaging, operating speed, and exceptionally high coverage are readily available as a routine matter of adding branch instructions and the like to the program of the electronic data processor.

Information about the media, darkness settings, and resolution typically will be entered by the operators or communicated in data of the print job. Toner type information, as well as an adjustment factor unique to this invention, are contained in memory of the toner cartridge and retried electronically by the data processing system of the printer. Environmental conditions, including the combined effects of humidity and temperature, can be obtained in a known manner by an automatic observation by the electronic data processor of voltage between the photoconductor roller 7 and a transfer roller (not shown) in nip contact with the photoconductor roller 7 used in imaging to attract toner from the photoconductor roller 7 to paper or the like in the nip. The voltage on the transfer roller is increased until a predetermined current is obtained. The final level of that voltage defines the environment.

Also, in accordance with this invention, an adjustment factor is employed not related to individual information for each factor, which define the other factors. This adjustment factor permits subsequent versions of the imaging device to be modified based on actual experience during use. Accordingly, if actual measurements of toner usage are found to be slightly too high, the adjustment factor in subsequent imaging would be changed, for example, from 1 to 0.95. Similarly, if actual measurements are found to be slightly too low, the adjustment factor in subsequent imaging would be changed, for example, from 1 to 1.05

Figure 2A:
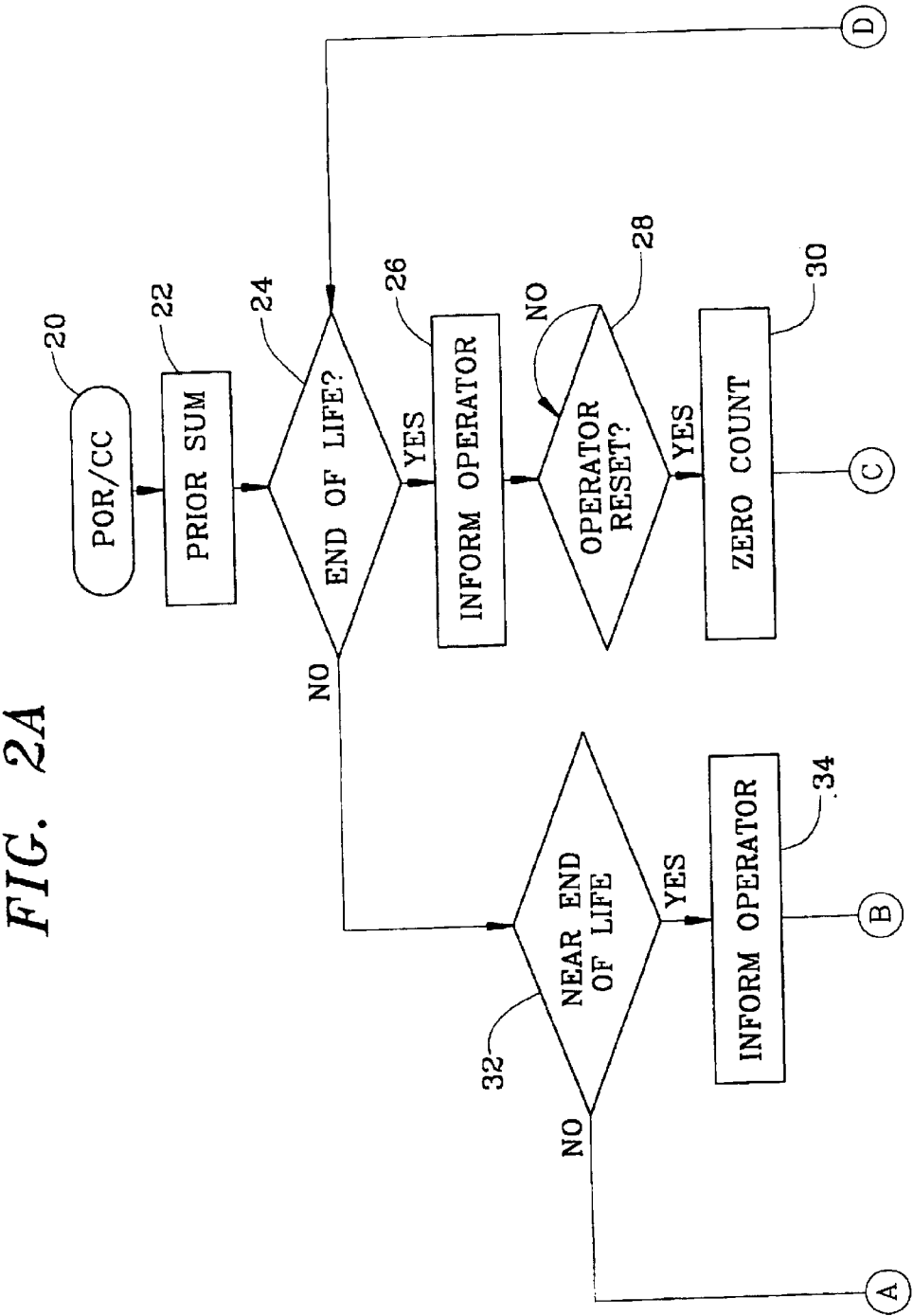
Figure 2C:
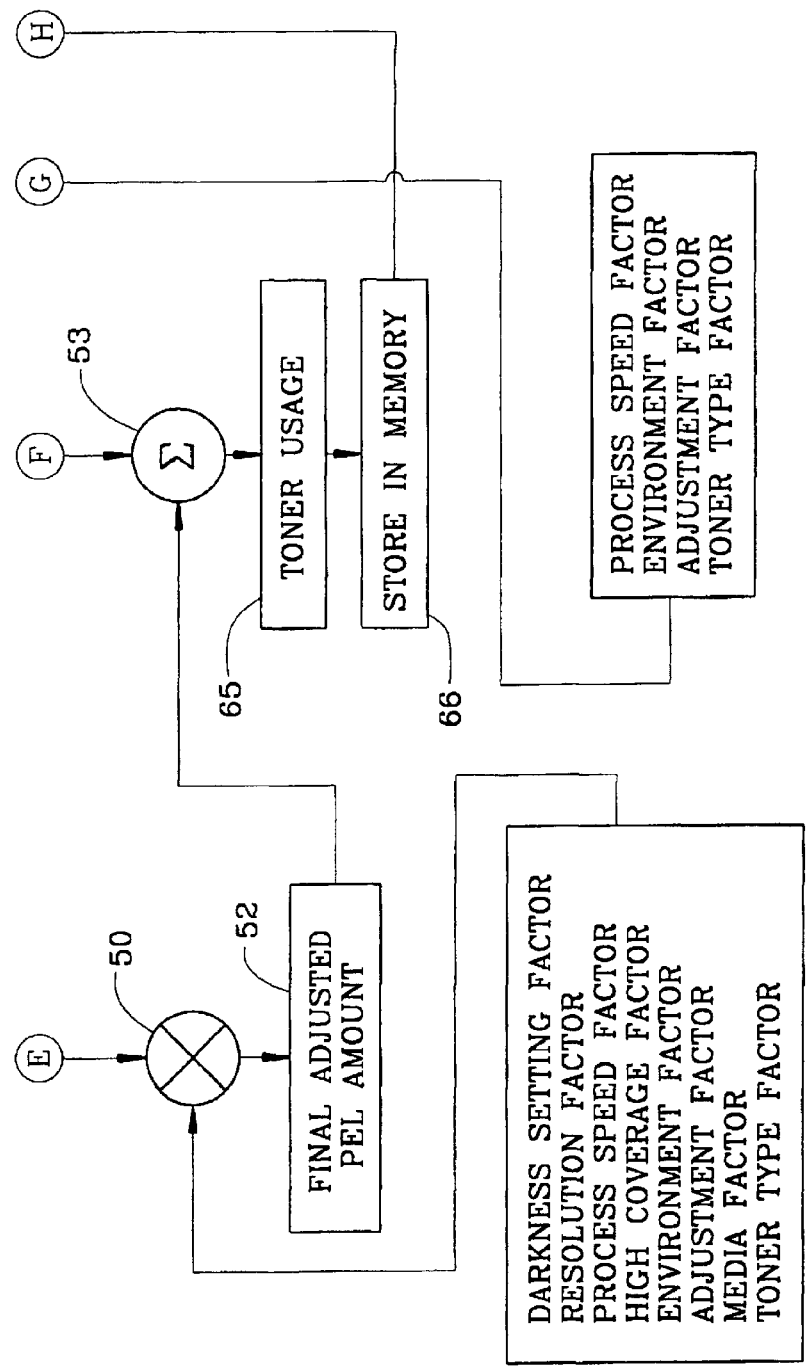

A specific implementation is illustrated in FIG. 2. Operation is initiated by action 20 at power on reset (POR) or cover closed (CC). The prior usage sum is then observed from nonvolatile memory in action 22. The prior usage sum is the usage amounts adjusted by adjustment factors computed as follows.

Decision 24 compares the usage total (from action 65) to a predetermined number indicative of end of life (for example, cleaner full). Decision 24 also compares the count of pages imaged (action 38) with a predetermined number indicative of end of life. If either is yes, a warning is sent to the operator in action 26 and decision 28 takes no further operation occurs until the operator enters an acknowledgement that the reset action has been taken (i.e., toner has been added or the cleaner chamber has been emptied or replaced). When the acknowledgement occurs, decision 28 is yes and action 30 resets the nonvolatile memory count to zero or the equivalent.

When decision 24 was no, decision 32 compares the usage total (from action 65) to a predetermined number indicative of near end of life. Decision 32 also compares the count of pages (action 38) with a predetermined number indicative of near end of life. If either is yes, action 34 initiates a warning to the operator while continued imaging is permitted.

Decision 36 is involved, both when decision 32 is no and when action 34 is invoked by decision 32 being yes. Decision 36 determines if a page is being printed. If no, decision 36 continues to observe at regular intervals whether a page is being imaged (this normally would be known from the software condition that a bit map for the page is being composed by the electronic data processor controlling the imaging). When decision 36 is yes, action 38 increments a page count to one more. (A page count can be a confirming calculation to determine toner usage. The page counting of the embodiment is of all pages moved through the printing operation, as the number of such pages which are blank or nearly blank is normally insignificant to being indicative of toner usage.)

Action 40 then counts the number of pels imaged for the page. (In the imaging device, which images by parts of pels, such as 4 vertical slices in a 1200-dots-per-inch pel, where any such slice in a pel is to be imaged, the entire pel may be considered imaged.) The number of pels imaged is then adjusted by a factor for the amount of toner used from the toner source. (More toner is used per pel as toner is depleted from an original source.) Action 42 defines the amount of toner used from the current total for toner usage and compares that with a number for total amount in the toner source. That is then used in action 44 to provide a factor for current toner usage for each pel. This factor is applied to the number of pels in multiplier 46 and the resulting number is stored in action 48.

The amount in action 48 is then adjusted by other factors as discussed in the foregoing. These are multiplied to the amount in action 48 in multiplier 50 and the amount resulting is stored in action 52. (With respect to each page the factors may be multiplied together and the resulting number multiplied with the previous amount in multiplier 50.)

The total in action 52 is the final calculation for pels. It is summed in adder 53 with a second amount developed from cycle operations, determined from decision 54. Decision 54 determines if an operating cycle of the photoconductor roller 7 is occurring. If no, decision 54 continues to observe at regular intervals whether a cycle is occurring (This could be known from any number of actions of the software, such as motor operation rotating roller 7.). When decision 54 is yes, action 56 increments a cycle count by one more.

This number is then adjusted by a factor for the amount of toner used from the toner source. Action 58 defines the amount of toner used from the current total for toner usage and compares that with a number for total amount in the toner source. That is then applied in action 60 to provide a toner usage amount.

The value in action is then adjusted by other factors as discussed in the foregoing. These are multiplied to the amount in action 60 in multiplier 62 and stored in action 64.

The total in action 64 is the final calculation for cycles. It is summed in action 53 with the amount for pels in action 52. That total is stored in action 65 and represents toner usage as discussed in the foregoing (i.e. when compared against predetermined amounts in decisions 24 and 32, toner usage is ascertained). The amount stored in action 65 is stored in memory in action 66 for subsequent use by decision 24 and 32.

In this embodiment, only process speed, environment and toner type are acted on as factors for cycles of operation. Factors such as darkness setting, resolution and media type are pertinent to pel printing, but not to operation in which no pels are printed. Should the imaging device react to, for example, high darkness setting during low or no pel printing, a factor for that might be added for application to the cycle amount.

In an ideal calculation the amount from pel printing would be subtracted from the amount for the cycle for which the pels are printed. In fact, however, most printing is at low coverage so that such a calculation would not be significant to the result. Where coverage is high, a factor for that is employed and that factor, obtained by trial and error, necessarily compensated for the amount added for each high coverage cycle.

In this embodiment, the change in toner usage per pel with usage from the toner source is toward higher usage as toner is depleted (believed to be because fines initially print in greater amount). This change is scaled linearly in the embodiment of FIG. 2, which provides satisfactory accuracy.

The page count of pages is kept, as indicated in the discussion of FIG. 2. This can serve as an alternative measurement of toner usage in that the warning and shut down discussed with respect to actions 26 and 34 would also be initialed at a predetermined page count.

The adjustment factor is used as conditions change or are better understood. It changes for future printers. For example, when toner measurement has been running high, the adjustment factor may be changed accordingly, for example from 0.95 to 0.90. A major advantage of the adjustment factor is that it can be stored in a periodically is replaceable member, specifically the toner cartridge, and thereby permit adjustments of the imaging operation without physically recalling the printer or other imager.

As many factors have potential influence in the scaling and some may be minor, it is anticipated that implementations of this invention can take a wide variety of forms. The machine factors generally have values between 0.85 and 1.2, but darkness setting, resolution and toner type might be much greater (for example, darkness setting at 0.65 to 1.1, resolution at 025 to 1, and toner type at 1 to 2).

What is claimed is:

1. A method of determining amount of toner transferred from a toner source in an electronic data processor controlled imaging device having a rotated photoconductive roller which receives latent electrophotgraphic images and a rotated developer roller which transfers toner from said toner source to said photoconductive roller comprising employing electronic data processor to:

determine the number of pels at least partially imaged by said device and assigning a predetermined pel weight factor to said number of pels to obtain a first total, determine the amount of rotation of said photoconductive roller during imaging operation and assigning a predetermined rotation weight factor to said amount of rotation to obtain a second total, summing said first total and said second total to obtain a third total, and determining the amount of toner transferred based on said third total.

2. The method as in claim 1 in which one or more of said first total or said second total or said third total is modified by multiplication by one or more factors related to imaging by said imaging device.

3. The method as in claim 2 in which said first total is modified by multiplication by at least four factors related to imaging by said imaging device.

4. The method as in claim 2 in which said second total is modified by multiplication by at least two factors related to imaging by said imaging device.

5. The method as in claim 3 in which said second total is modified by multiplication by at least two factors related to imaging by said imaging device.

6. The method as in claim 3 also including:

determining the number of pages having pels operated on for imaging by said imaging device, and also determining the amount of toner transferred from said source on the basis of said number of pages.

7. The method as in claim 4 also including:

determining the number of pages operated on for imaging by said imaging device and also determining the amount of toner transferred from said source on the basis of said number of pages.

8. The method as in claim 5 also including:

determining the number of pages operated on for imaging by said imaging device, and also determining the amount of toner transferred from said source on the basis of said number of pages.

9. The method as in claim 1 also including:

multiplying one or more of said first total, said second total, and said third total by a factor which represents a value substantially of one and which may be modified to a different value to adjust said determination of amount of toner.

10. The method as in claim 2 also including:

multiplying one or more of said first total, said second total, and said third total by a factor which represents a value substantially of one and which may be modified to a different value to adjust said determination of amount of toner.

11. The method as in claim 3 also including:

multiplying said first total by a factor which represents a value substantially of one and which may be modified to a different value to adjust said determination of amount of toner.

12. The method as in claim 4 also including:

multiplying said second total by a factor which represents a value substantially of one and which may be modified to a different value to adjust said determination of amount of toner.

13. The method as in claim 5 also including:

multiplying said second total by a factor, which represents a value substantially of one, and which may be modified to a different value to adjust said determination of amount of toner.

14. The method as in claim 11 also including:

determining the number of pages having pels which are imaged, and also determining the amount of toner transferred from said source on the basis of said number of page having pels, which are imaged.

15. The method as in claim 12 also including:

determining the number of pages having pels, which are imaged, and also determining the amount of toner transferred from said source on the basis of said number of pages having pels, which are imaged.

16. The method as in claim 13 also including:

determining the number of pages having pels which are imaged, and also determining the amount of toner transferred from said source on the basis of said number of pages having pels, which are imaged.

17. The method as in claim 1 also including:

multiplying one or more of said first total, said second total, and said third total by a factor obtained from a replaceable toner cartridge of said imaging device.

18. The method as in claim 2 also including:

multiplying one or more of said first total, said second total, and said third total by a factor obtained from a replaceable toner cartridge of said imaging device.

19. The method as in claim 3 also including:

multiplying one or more of said first total, said second total, and said third total by a factor obtained from a replaceable toner cartridge of said imaging device.

20. The method as in claim 4 also including:

multiplying one or more of said first total, said second total, and said third total by a factor obtained from a replaceable toner cartridge of said imaging device.

21. The method as in claim 5 also including:

multiplying one or more of said first total, said second total, and said third total by a factor obtained from a replaceable toner cartridge of said imaging device.

* * * * *